May 27, 1969 R. W. ASTHEIMER ET AL 3,446,559
INSTRUMENT TO CORRECT SURVEY ERRORS CAUSED BY
ATMOSPHERIC REFRACTION
Filed Feb. 9, 1966

INVENTORS
ROBERT W. ASTHEIMER
THOMAS F. McHENRY
BY
Joseph Levinson

United States Patent Office 3,446,559
Patented May 27, 1969

3,446,559
INSTRUMENT TO CORRECT SURVEY ERRORS CAUSED BY ATMOSPHERIC REFRACTION
Robert W. Astheimer, Westport, and Thomas F. McHenry, Norwalk, Conn., assignors to Barnes Engineering Company, Stamford, Conn., a corporation of Delaware
Filed Feb. 9, 1966, Ser. No. 526,201
Int. Cl. G01n 21/46
U.S. Cl. 356—128      6 Claims

ABSTRACT OF THE DISCLOSURE

A long-range surveying instrument to correct errors caused by atmospheric refraction comprising a transmitter which projects a moving pattern of bars in two spectral regions having a particular phase relationship. A remote receiver compares the phases of the two spectral regions and provides an output signal to a meter indicative of any refractive error caused by the atmosphere.

---

This invention relates to surveying, and more particularly to a long-range surveying instrument for correcting survey errors caused by atmospheric refraction.

Surveying over considerable distances is limited by atmospheric refraction effects which cause errors in the elevation angles to be measured. Varying patterns of density and intensity of cold and warm air currents may cause bending of the line of sight up or down in varying amounts over long horizontal paths. Errors as large as one minute of arc, or a foot per mile, may occur, which limit the permissible distance between survey stations.

It is an object of the present invention to provide a surveying system which will greatly increase the practical surveying range.

A further object of this invention is to provide a long-range surveying instrument which is simple to operate and maintain.

Still another object of this invention is to provide a long-range surveying instrument which does not require high-accuracy pointing.

In carrying out this invention in one illustrative embodiment thereof, the long-range surveying instrument of this invention includes a long focal length transmitter and a remotely positioned receiver which, for example, may be suspended from a helicopter. The transmitter projects radiation in a moving pattern of bars in at least two spectral regions. These spectral regions are selected where the index of refraction of the atmosphere is different for each region, e.g., from 2900–3000 A., 1.0002907 approx., and from 5800–6000 A., 1.0002763, approx. The remotely positioned receiver has at least two radiation detectors, each of which responds to radiation of a different one of the spectral bands propagated by the transmitter. The receiver includes means for comparing the phase of the output signal of the radiation detectors in order to provide corrections for errors caused by atmospheric refraction between the transmitter and the receiver.

Figure 1:
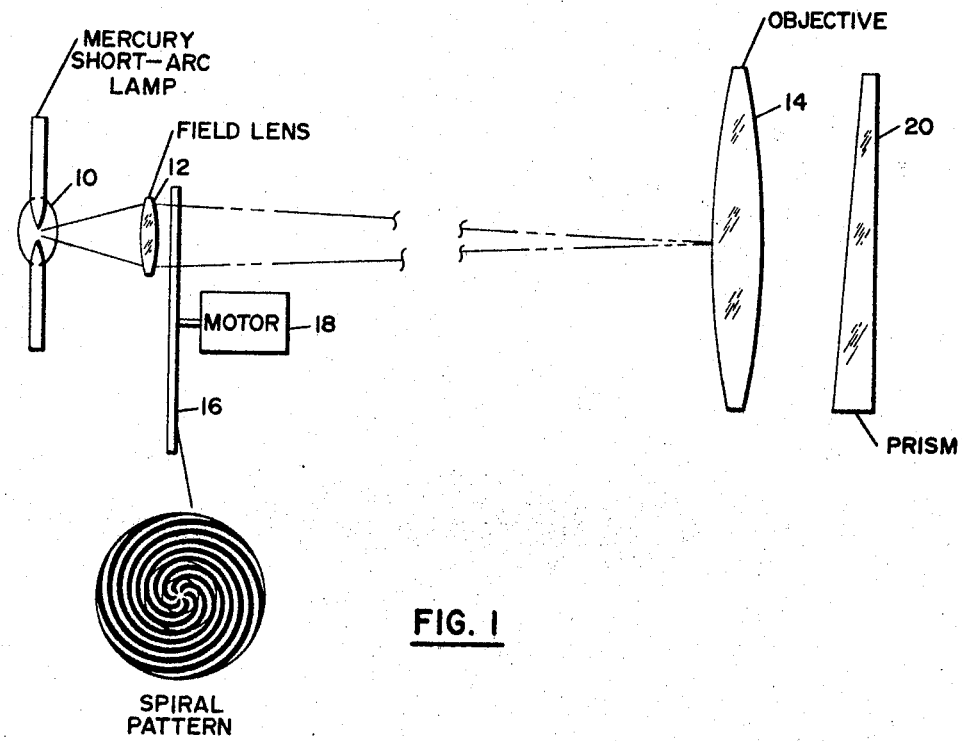
Figure 2:
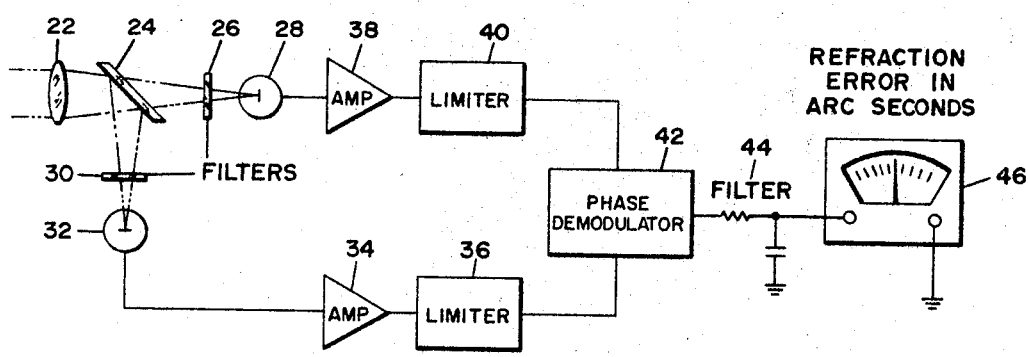

The invention, together with further objects and advantages thereof, may best be understood by reference to the following description, taken in connection with the accompanying drawings, in which:

FIG. 1 is a schematic diagram of the transmitter of the long-range surveying instrument embodied in this invention, and FIG. 2 is a schematic and block diagram of the receiver of the long-range surveying instrument of this invention.

The present invention makes use of the fact that when refraction error occurs, it is accompanied by dispersion. By being able to measure the dispersion, the refraction error can be corrected. This is accomplished in the present invention by providing a transmitter which projects a moving pattern of bars of alternate light and shadow which are refracted by a prism. These sets of bars of light are projected in two spectral regions with a 90° spatial phase difference, and the sets are refracted differently in the atmosphere if refraction occurs. A receiver positioned some distance away detects the alternating spectral bands or colors in two separate electronic signal channels. The two bands have relatively the same frequency, such that the relative phase of the two periodic signals generated by the electronics of the receiver can measure any phase difference with high accuracy. By comparing the phase of the signals, the refraction error may be readily determined.

Referring now to FIG. 1, a transmitter is shown which is comprised of a small, compact arc lamp 10, a field lens 12 imaging the lamp 10 on a long-focal-length objective 14, a spiral reticle disc chopper 16 driven by a chopper motor 18, and an aperture prism 20, all of which are in optical alignment. The light source or lamp 10 may be any suitable source, for example, a 100 watt mercury short arc lamp, such as the PEK107 manufactured by PEK Laboratories, which will present to an observer miles away from the transmitter a flashing source about 4 inches in diameter, almost as bright as the sun. The spiral reticle 16, which is located in the focal plane of the lamp 10, performs the function of scanning the source lamp 10 over the field of view of the transmitter. The spiral reticle 16 is chosen since the perpendicular separation of the spokes of the reticle should remain constant throughout the field of view. This is necessary to maintain the phase shift between the two colors employed of approximately 90° separation throughout the field of view. Alternatively, a picket fence reticle may be utilized, whose spokes have constant separation and are driven by a linear motion. The spiral reticle 16 satisfactorily accomplishes the same result using rotary motion, and is employed for simplicity purposes. The prism 20 is designed to deviate violet light (3000 A.) more than the red light (6000 A.) by approximately 90 spatial degrees. Although the particular design employed may vary the parameters utilized, merely for purposes of illustration, assuming the spiral reticle has slots approximately .04 inch wide, and a searchlight lamp 10 having a focal length of approximately 160 inches,, which corresponds to 50 arc seconds, the prism 20 would be designed to deviate the violet light one-half the slit width, which is equivalent to 90 electrical degrees, or 25 arc seconds. Although different phase shifts may be used, the phase shift of 90° produced by the prism is important and is preferable, as it permits the measurement of phase, and hence of refraction, in the vicinity of zero. This shift is obtained by the shape and dispersion of the prism. If, in setting up the transmitter, the shift is not 90°, the prism may be rotated slightly to change the vertical separation of the spectral bands in the vertical direction. The objective lens 14 is shown for illustrative purposes. A diffraction-limited folded reflective objective system is preferred.

The use of the transmitter shown in FIG. 1 permits the use of a very simple receiver as shown in FIG. 2. The receiver is comprised of a simple objective lens 22 which images a field of view through a beam splitter 24 and through a filter 26 onto a detector 28, and through a filter 30 onto a detector 32. The lens 22, which may be of calcium fluoride or any other suitable material, and the beam splitter 24 may image a large field of view, on the order of 10° vertical by 20° horizontal, on the detectors 28 and 32. The filter 26 passes radiation short of 3000 A. only, and the filter 30 passes radiation beyond 5800 A.

only. The detectors 28 and 32 may be photomultipliers of the type 1P28 and 1P21, respectively, or any other type of radiation detectors suitable for detecting the wavelengths employed. The detector 28 generates a signal in the violet spectral band (3000 A.), which is applied via amplifier 38 and limiter 40 to a phase demodulator 42, while the detector 32 applies a signal from the red spectral band (6000 A.) to an amplifier 34 and a limiter 36 to the phase demodulator 42. The phase demodulator 42 may be type EC310 made by Barnes Engineering Company. The output of the phase demodulator 42 is applied through a filter 44 to a meter 46 which reads refraction error in arc seconds. Because of the large field of view of the receiver, the pointing accuracy required is low. The refraction error may be read directly, with no computation required.

The long-range surveying instrument of this invention has a range on the order of 10 miles. The system is portable, and can be sighted parallel to the axis of a theodolite. It is simple to operate, and provides the surveyor with desired error data immediately, without further processing or calculations. The system solves background discrimination problems except for the direct viewing of the sun in the field of view, which would delay observation for at most 40 minutes at dawn and sunset. During such periods the other leg of the triangle could be observed, so that this delay provides no limitation whatsoever. By measuring the elevation angles of two legs of the triangle, distances may be calculated in conventional manner. The system detects on the order of .25 arc second image displacement between the 6000 A. and 3000 A. spectral regions, which would correspond to a 5 arc second gross refraction error, or about 15 inches in 10 miles.

What we claim is:

1. A long-range surveying instrument to correct survey errors caused by atmospheric refraction comprising
   (a) a transmitter including an aperture for projecting radiation in a moving pattern of bars in at least two spectral regions having a predetermined phase relationship,
   (b) a receiver remotely positioned to receive said pattern having at least two radiation detectors each of which responds to radiation of a different one of said two spectral regions propagated by said transmitter to provide an output signal, and
   (c) means in said receiver for comparing the phase of the output signals of said two radiation detectors in order to provide a third signal indicative of a correction for errors caused by atmospheric refraction between said transmitter and said receiver.
2. The instrument set forth in claim 1 wherein said transmitter comprises a light source, a field lens, a spiral reticle in the focal plane of said source, an objective, and a prism for refracting at least two spectral regions at the aperture of said transmitter, all in optical alignment.
3. The instrument set forth in claim 1 wherein said receiver includes an objective lens, a beam splitter, a pair of filters, and a pair of detectors, all in optical alignment for applying different spectral regions to each detector.
4. The instrument set forth in claim 1 wherein
   (a) said transmitter comprises a light source, a field lens, a spiral reticle in the focal plane of said source, an objective, and a prism for refracting at least two spectral regions at the aperture of said transmitter, all in optical alignment, and
   (b) said receiver includes an objective lens, a beam splitter, a filter, and a pair of detectors, all in optical alignment for applying different spectral regions to each detector.
5. The instrument set forth in claim 1 wherein said transmitter includes a light source and a spiral reticle which scans said source over a field of view.
6. The instrument set forth in claim 5 wherein said transmitter includes a prism at the aperture of said transmitter for providing a 90° phase shift.

References Cited

UNITED STATES PATENTS

| | | | |
|---|---|---|---|
| 3,123,772 | 3/1964 | Gerks | 325—67 |
| 3,124,799 | 3/1964 | Hagedorn et al. | |
| 3,366,957 | 1/1968 | Lode | 343—112 |

RONALD L. WIBERT, *Primary Examiner.*

T. MAJOR, *Assistant Examiner.*

U.S. Cl. X.R.

325—67